United States Patent

[11] 3,540,777

[72] Inventor Mario Revelli de Beaumont
Via Cravero 70, Grugliasco, Italy
[21] Appl. No. 777,090
[22] Filed Nov. 19, 1968
[45] Patented Nov. 17, 1970
[32] Priority Dec. 2, 1967
[33] Italy
[31] No. 53959/67

[54] CHAIR FOR AUTOMOTIVE VEHICLES WITH A DISPLACEABLE BACK
5 Claims, 5 Drawing Figs.
[52] U.S. Cl. .................................................. 297/284, 297/376, 297/460
[51] Int. Cl. ...................................................... A47c 7/46
[50] Field of Search............................................ 297/460, 376, 284, 355, 103, 383, 361, 353

[56] References Cited
UNITED STATES PATENTS
660,904 10/1900 Kling............................ 297/10:
1,473,541 11/1923 Berninghaus................. 297/38:

Primary Examiner—Reinaldo P. Machado
Attorney—Young and Thompson

ABSTRACT: A chair for automotive vehicles wherein th back is connected to the seat, on each side, by means of a pa of hinged members forming a hinged quadrilateral which a lows forward and rearwards displacement of the back wit reference to the seat.

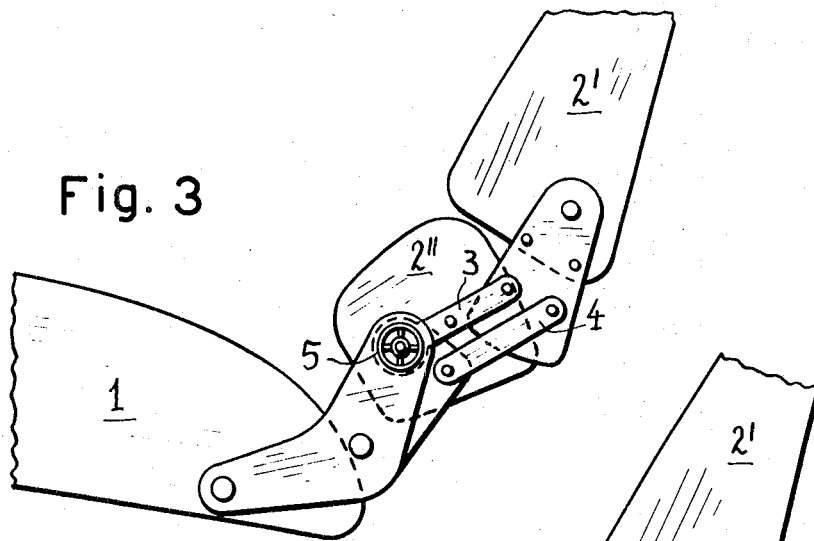
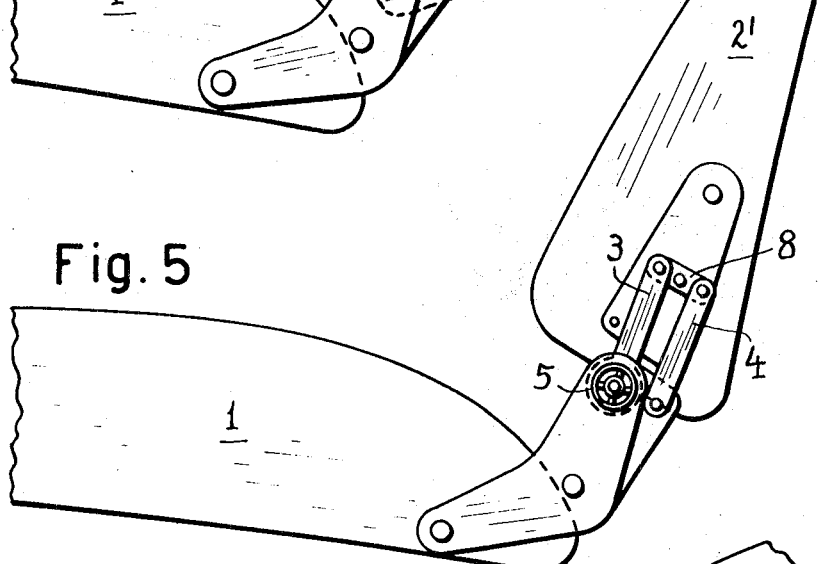
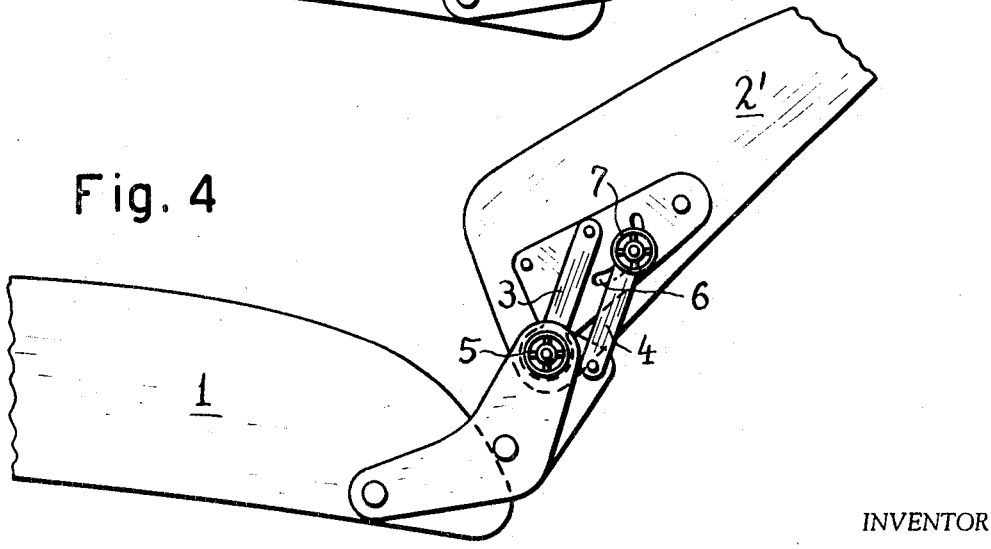

CHAIR FOR AUTOMOTIVE VEHICLES WITH A DISPLACEABLE BACK

This invention relates to the chairs for automotive vehicles and has for its object an article of the above mentioned kind characterized in that its back is provided with means which allow its forward and backwards displacement with respect to the seat; such displacement may be performed without varying the tilt, while separate means may be provided in order to modify said tilt; both above mentioned adjustments may further be made conjointly or independently.

By carrying out said two adjustments, or but one of them, the driver can adjust the chair in an effective and complete way, making it fit according to its own constituting character and suitable for any individual requirement, so as to obtain the most complete functional comfort, which has a noticeable importance especially in sports vehicles, but which offers a not negligible advantage also in other cases, particularly on vehicles appointed for long travels or running on hard roads.

According to the invention, the seat is connected with the back through members and joints forming a hinged quadrilateral having at least a blockable joint and preferably also with a joint having a variable hinging position, and provided with blocking means for securing the agreed hinged position.

The following description is made with reference to the annexed drawings which show a not restrictive embodiment thereof.

In the drawings:

FIG. 3 is a view similar to the preceding figure, but in a second position, wherein the back has been displaced backwards without changing its tilt;

FIG. 4 shows a modification, and therein the back, instead of having been retracted, has been subjected to a tilting variation with reference to the position of FIG. 2;

FIG. 5 shows a further modification.

Figure 1:
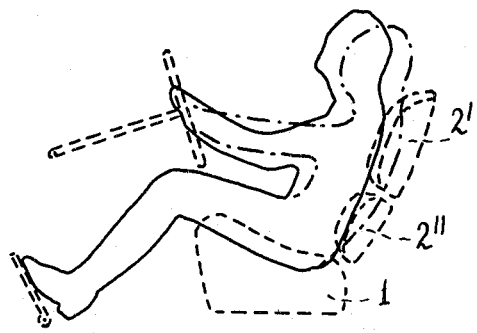
FIG. 1 is a diagram of the arrangement according to the invention, showing the behaviour of a human body, particularly of the femoral region thereof, related to the back's positions with respect to the seat.

Referring now to the drawings: 1 is the seat of the chair, and it is diagrammatically and incompletely shown, since it does not have necessarily by itself any distinctive peculiarity.

The back 2' is linked from each side to the seat 1 (viz. to its framework), by means of a hinged parallelogram made of a pair of connecting rods 3 and 4. At least one of the four joints of this parallelogram can be locked by means of a screw tightening handwheel 5 (or by whatever other known or special locking device). Such hinged parallelogram connection, when the locking device is released, makes it possible to move the back portion 2' forward and backwards, without loosing a perfect parallelism with its primary position; by tightening thereafter the locking device 5, the back 2' will be secured in the position to which it has been brought.

Figure 2:
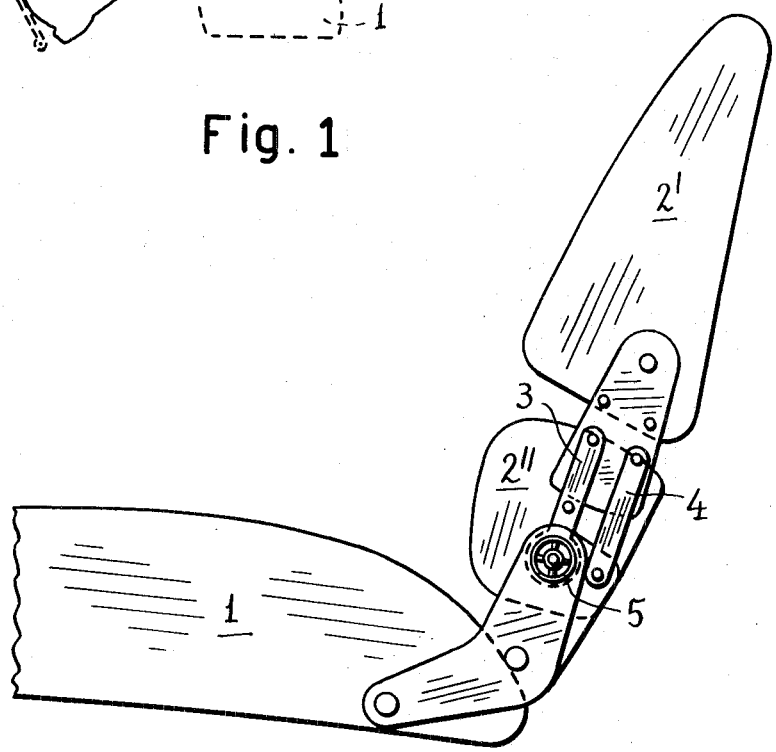
FIG. 2 is a diagrammatic side view of the connection means between seat and back, in a first position.

Preferably, the back is divided in two parts, an upper main part 2' and a lower smaller part 2'', as illustrated in FIGS. 1 to 3. The lower back part 2'' is supported by the connecting rods 3 and 4 and may be fastened to some of said rods, whereby it will accompany their corresponding inclination, or may be articulated so as to become swinging freely, or may even by connected in its turn through a double joint in a similar manner to that of the upper part 2' of the back, so as to be displaced in parallel relation to said part 2'.

However, such a subdivision in two parts of the back is not necessary for carrying out the invention; in fact, according to the FIGS. 4 and 5, the back 2' may also be made in one piece, i.e. without the separately movable lower part 2''.

In the cases wherein it should be possible to vary also the tilt of the back, at least one of the parallelogram joints, which may be the same mentioned before or another of the existing four, is located through a slot 6 (FIG. 4) and is provided with a corresponding locking device 7, and according to such an arrangement, at least one of the quadrilateral sides may be lengthened or shortened, or may anyhow be made not parallel to the opposite side, ceasing thereby to constitute a parallelogram and allowing to vary the tilt of the back while operating its forward or backwards movement, or after having fixed its longitudinal position (or, moreover, independently from said longitudinal displacement).

In other words, the longitudinal position and the inclination of the back become two adjustments which may be done conjointly or independently.

According to a modification (FIG. 5), in order to vary the inclination, the quadrilateral does not miss its parallelogram feature and one of its virtual sides, formed by one of the two elements of the chair (i.e. back and seat) is replaced by an insert 8 (for instance a rocker arm) capable of a securable swinging movement with respect to the chair body. The positional variation of said rocker arm causes a variation of the back's inclination with respect to the seat and the new inclination is maintained in any of its forward or backwards positions.

The hinged quadrilateral defined by the rods 3 and 4 may differ from a parallelogram in the cases wherein a limited variation of its back's slope should be considered as tolerable or advantageous, when its longitudinal position is being varied with respect to the seat.

The invention may, of course, be carried out also without the device for varying the inclination, but only with the device for varying the longitudinal position of the back of the chair. Likewise, the construction of said device may be varied within wide limits with respect to what described and illustrated above, so as to be fit for all practical requirements, and for an eventual combination with other devices existing on the vehicle, or by the replacement of some elements by their technically equivalent means.

I claim:

1. A chair for automotive vehicle, comprising a seat and a back, and connecting means between said seat and said back, including on each side a first member articulated at its ends with said seat and said back, a second member articulated with said seat and said back, said first and second member on each side, said seat and said back forming a hinged quadrilateral; at least a locking device connected to a portion of said chair and to one of said connecting means, and means for varying the inclination of said back with respect to said seat, whereby said back may be moved in forward and rearwards directions with respect to said seat and can be secured in the chosen position and with the chosen inclination.

2. A chair as set forth in claim 1, wherein said second member is parallel to said first member and has the same length as said first member, so that said hinged quadrilateral is a parallelogram and said back maintains unchanged the chosen inclination when it is moved in forward and rearward directions with respect to the seat, whereby the choices of the position and inclination of the back are independent.

3. A chair as set forth in claim 1, further comprising a slot in one of said members and a connecting and locking device cooperating with said slot, whereby the inclination of said back may be varied and secured.

4. A chair as set forth in claim 1, further comprising a rocker arm articulated to the ends of said members and to a portion of the chair, and a locking means mounted on the same portion of the chair and cooperating with said rocker arm, whereby the inclination of said back may be varied and secured.

5. A chair as set forth in claim 1, wherein said back comprises a main upper portion hinged to said members and a smaller lower portion connected at least to some of said members and supported by them.